United States Patent
Zhang et al.

(10) Patent No.: US 9,504,979 B2
(45) Date of Patent: Nov. 29, 2016

(54) RADIAL-PARALLEL CATALYTIC REACTOR

(71) Applicants: Huaihai Zhang, Diamond Bar, CA (US); Shiyu Zhao, Diamond Bar, CA (US)

(72) Inventors: Huaihai Zhang, Diamond Bar, CA (US); Shiyu Zhao, Diamond Bar, CA (US)

(*) Notice: Subject to any disclaimer, the term of this patent is extended or adjusted under 35 U.S.C. 154(b) by 0 days.

(21) Appl. No.: 14/721,898

(22) Filed: May 26, 2015

(65) Prior Publication Data

US 2015/0343406 A1 Dec. 3, 2015

(30) Foreign Application Priority Data

May 30, 2014 (CN) .................... 2014 2 0287439 U (51) Int. Cl.
| | |
|---|---|
| *B01J 8/00* | (2006.01) |
| *B01J 8/02* | (2006.01) |
| *B01J 8/04* | (2006.01) |
| *B01J 19/00* | (2006.01) |
| *B01J 19/24* | (2006.01) |

(52) U.S. Cl.
CPC ............ *B01J 8/0411* (2013.01); *B01J 8/001* (2013.01); *B01J 8/0492* (2013.01); *B01J 8/0496* (2013.01); *B01J 2208/0092* (2013.01); *B01J 2208/00194* (2013.01); *B01J 2208/00548* (2013.01); *B01J 2208/00823* (2013.01); *B01J 2208/00849* (2013.01); *B01J 2208/00893* (2013.01); *B01J 2208/00938* (2013.01); *B01J 2208/027* (2013.01); *B01J 2219/00038* (2013.01)

(58) Field of Classification Search
CPC .............. B01J 8/00; B01J 8/001; B01J 8/02; B01J 8/04–8/0411; B01J 8/0492; B01J 8/0496; B01J 19/00; B01J 19/24; B01J 2208/00008; B01J 2208/00548; B01J 2208/00823; B01J 2208/00893; B01J 2208/023; B01J 2208/027
See application file for complete search history.

(56) References Cited

U.S. PATENT DOCUMENTS

| | | | |
|---|---|---|---|
| 1,970,923 A | 8/1934 | Spalding | |
| 2,450,804 A | 10/1948 | Loy | |
| 2,517,525 A | 8/1950 | Cummings | |
| 4,880,603 A | 11/1989 | Forster | |
| 5,427,760 A | 6/1995 | Grotz | |
| 7,388,106 B2 * | 6/2008 | Klanner | ................. B01J 8/0415 518/726 |

\* cited by examiner

*Primary Examiner* — Natasha Young (57) ABSTRACT

The present invention comprises an axial radial catalytic reactor with a shell (as gas tight seal to maintain process gas flows within it) and a feed tube (passing from a source of process gas flow through the shell and into it do deliver feed gas to one or more levels of two annularly sequential catalyst beds), where one end of the feed tube is used as an inlet for feeding reaction mass. In one embodiment of the invention, an interior end of the feed tube is sealed.

5 Claims, 8 Drawing Sheets

RADIAL-PARALLEL CATALYTIC REACTOR

The present application is related to and claims the benefit under 35 U.S.C. §119(a) to a Chinese Patent Application No. 201420287439.2 filed on May 30, 2014 in the Peoples' Republic of China, the entire disclosure of which is hereby incorporated by reference.

FIELD OF THE INVENTION

The present utility model relates to a chemical catalytic reactor, especially to a multi-stage radial-parallel-multi-bed-layer reactor.

BACKGROUND OF THE INVENTION

Currently, large radial reactors have been widely used. For consideration of structure and process, such a reactor in scale-up usually has its catalyst bed divided into multi stages and separately placed into a same shell. Each stage has separation space formed therebetween, and reaction mass passes through a gas-collection channel of a catalyst bed along a radial direction, and moves downward along an axial direction, then passes through the separation space into a gas-distribution channel of a catalyst bed at a next stage. In the case of an exothermic reaction, typically, a heat transfer means is disposed in the separation space, such as a heat exchanger or a quench-fluid introducing means. Such multi-stage design provides a good solution for the demands of structure and process in scale-up of a reactor, however, when adopting a multi-bed-layer design, this approach faces the following problems: axial multi-stage technology leads to unrepeatable overlay of catalyst beds due to catalyst bed installation sequence, therefore it is unable to meet the requirements of further scale-up production; in applications of a multi-bed-layer radial reactor, because of its inability to adopt a multi-stage design, it usually has a cooling tube with/without an opening buried in the catalyst layers, so as to transfer reaction heat with coolant or quench fluid, but it destroys adiabatic conditions of the catalyst layers. The presence of cooling tube and quench fluid makes flow field and temperature distribution become very complex, causing a significant adverse effect on catalytic activity and lifespan; moreover, the regulation and control of coolant or quench fluid is very difficult.

The prior art presents a dizzying array of radial reactor arrangements. However, careful consideration of these arrangements, as one skilled in the art would do, allows a designer to understand limitations of unwarranted applications for features of one radial reactor to another, where either process, mechanical or structural requirements of a specific application create such practical obstacles.

U.S. Pat. No. 5,427,760 describes a rather subtle improvement for sequentially separate single bed radial reactors—addition of an external heat sink by way of a heat exchanger was an inventive step.

U.S. Pat. No. 1,970,923 describes a cylindrical reactor with only axial gas flow through multiple catalyst beds for product of sulfur trioxide, where a quench space above the catalyst bed is bounded by a perforated plate intended for gas re-distribution and direct gas quench within the space. The arrangement is especially ineffective, in that inadequate turbulent flow is achieved to achieve radial uniformity in temperature or quench gas mixing.

U.S. Pat. No. 4,880,603 describes an axial radial reactor for ammonia synthesis in which gas flow passes radially through only a single catalyst bed before flowing through narrow annular space to a subsequent catalyst bed. This design similarly is disabled as to uniformity of gas composition and temperature across a horizontal cross section thereof, as there is insufficient space for such uniformity to develop.

U.S. Pat. No. 2,450,804 describes an axial radial reactor having a single level of radial flow path from a center pipe to an outer annular collection space. In that radial flow path are three annularly sequential catalyst beds, spaced narrowly apart by perforated cylinders which allow injection of quench gas. The disability of this design is apparent to one skilled in the art, in that the spaced apart pipes used for injection of quench gas create cooled vertical zones separated by hot vertical zones due to inadequate mixing of gas from one reactor flowing immediately and without adequate mixing straight into the next catalyst bed.

U.S. Pat. No. 2,517,525 discloses a design similar to that of the '804 patent, in that it is not capable of having additional radial flow catalyst beds added above or below the single level of radial flow catalyst beds. However, the '525 patent provides for gas leaving one annular catalyst bed to flow upward to a very small space beneath a top hemispherical shell to mix with quenching gas. This design still suffers the disability of failing to provide adequate space volume in which uniform compositions and temperatures of the gas in horizontal cross section may be achieved before the gas flows to the next radial catalyst bed.

Therefore, there is an immediate need to provide a multi-bed-layer reactor, to solve the technical problems of a radial multi-bed-layer reactor, such as difficult-to-scale-up, complex pipelines in existing apparatus, unstable-at-work, difficult-to-operate, and hard-to-meet-processing-requirements, etc.

SUMMARY OF THE INVENTION

The present invention provides an axial radial reactor which is easy to scale up or down in process gas flows, stable at work and simple to operate.

The present invention comprises an axial radial catalytic reactor with a shell (as gas tight seal to maintain process gas flows within it) and a feed tube (passing from a source of process gas flow through the shell and into it do deliver feed gas to one or more levels of two annularly sequential catalyst beds), where one end of the feed tube is used as an inlet for feeding reaction mass. In one embodiment of the invention, an interior end of the feed tube is sealed.

The shell contains at least two sequential flow radial catalytic-reaction beds at a same shell elevation, and a spacing between them to achieve uniformity of temperature and gas composition, a disability overcome with the present invention over the prior art. The spacing is uniquely arranged between the radial catalytic-reaction beds such that no gas short circuiting occurs between the two radial catalytic-reaction beds.

The sets of two radial catalytic-reaction beds are in communication with the feed tube, and are disposed in parallel sequence along the feed tube, so that a reaction mass can enter through the feed tube into a first radial catalytic-reaction bed, through said spacing, and then to a second radial catalytic-reaction bed.

Each of the radial catalytic-reaction beds is provided coaxially with at least two annular, cylindrical reaction bed-layers maintained in a catalyst space defined within two perforated walls, a common top plate and a separate bottom plate, where each of the coaxial reaction bed-layers share the common top plate at a top end thereof.

A baffle is sealed to an underside of the common top plate and extends downward through an annular space between two radially arranged catalyst beds, defining a first annular channel between an outlet plate of a first catalyst bed at a first elevation and an inside surface of the baffle and thereby also defining a second annular channel between an outside surface of the baffle and an inlet plate of a second catalyst bed at that first elevation. Said spacing to achieve uniformity of composition and temperate of gas flowing to the second catalyst bed is defined by a top surface of a second common top plate located below the first and second catalyst beds, bottom plates of the first and second catalyst bed containers, an inner downward extension of the first catalyst bed container, and an outer downward extension of the second catalyst bed container. Said spacing is thus essentially a maximum radial space between the feed pipe and an inside cylindrical wall defining an annular gas collection space between itself and an inside of the shell.

Process gas flows from the feed pipe, through a first catalyst bed, and into the first channel to flow downward against the inside surface of the baffle into said spacing, where the process gas flow impacts the second common top plate and moves turbulently toward both the inner downward extension of the first catalyst bed container and the outer downward extension of the second catalyst bed container. Only after extensive mixing within said spacing does the process gas flow upward into the second channel so that it passes through the second catalyst bed and then to the annular collection space at the inside of the shell.

In other embodiments of the invention, heat exchange means are disposed at the baffle or within said spacing. Where heat exchange means are incorporated with the baffle, one end of the heat exchange means is optionally connected to the first common top plate where the baffle is sealingly connected to it, and the other end is connected to a bottom edge of the baffle.

The heat exchanger means incorporated into the baffle may be selected from an annular baffle or a spiral-plate heat exchanger, and the spiral-plate heat exchanger may have a coolant tube extending outside the shell.

In said spacing, there may be disposed a heat exchanger or a quench-fluid introducing means, and the heat exchanger may have a coolant tube for introducing and withdrawing coolant.

The radial-parallel multi-bed-layer catalytic reactor may have an interlining with a plurality of outer openings in communicate with the radial catalytic-reaction beds and forming outer gas-flow channels of the radial catalytic-reaction beds, wherein one end of the interlining is sealed with the shell, and the other end is in communication with the shell and may be provided with a discharge port such that catalytic reaction product is discharged outside the shell.

The radial-parallel catalytic reactor may comprise at least two external tubes in communication with each radial catalytic-reaction bed respectively and extending through the shell for directly discharging catalytic reaction product outside the shell.

The reaction mass flow direction in said radial catalytic-reaction beds may be a centrifugal or centripetal direction.

The sealed end of said feed tube may be located within the shell.

The feed tube may comprise a primary feed tube and a branch tube, the primary feed tube being located outside the shell and in parallel connection with the radial catalytic-reaction beds via the branch tube.

The shell may be two or more in number.

The present utility model employs a parallel structure of catalyst beds, and combines a new type of interlayer thermal transfer structure outside of the catalyst beds, thus constituting a novel multi-stage radial-parallel multi-bed-layer reactor which utilizes the characteristics of parallel catalyst beds and thus can have the following advantages: because the catalyst beds are in parallel, reactants at each stage of the catalyst beds are separately discharged outside the reactor, thus avoiding the reactants from entering into a next stage of the catalyst beds for repeated reaction; since the reactants do not reach a next stage of the catalyst beds, reaction heat is not accumulated at a next stage, thus simplifying the heat transfer process and means; the reaction process at each stage is the same, therefore the operation work of the added apparatus is relatively simple, this is beneficial to scale-up of the multi-bed-layer radial reactor.

The described multi-stage radial-parallel multi-bed-layer reactor utilizes a heat insulation means disposed in an annular gap between multi-bed-layers to regulate and control the reaction mass that has been exported from the catalyst layers, and can have the following advantages: the regulation and control of the reaction mass is performed outside of the catalyst layers, this avoids the influence of the regulation and control device as well as the introduced fluid on the catalytic activity, thus improving the catalyst activity and lifespan, and avoids the influence of the regulation and control device as well as the introduced fluid on uniform distribution of reaction mass and uniform temperature within the reaction layers, thus simplifying the reactor design, and avoids adverse consequences that bad distribution of reaction mass in a previous layer is accumulated to a next stage; by individual or combination use of the following various embodiments, a wide-range regulation and control of the physical state and chemical composition of the reaction mass can be performed, and approaches are relatively simple and have a stable effect; the present utility model meets the requirements of scale-up of a multi-bed-layer radial reactor, and has simple structure, easy operation and stable work, which is beneficial to improvement of the quality of the reactor operation and improvement of product quality.

DETAILED DESCRIPTION OF THE PREFERRED EMBODIMENTS

Hereinafter, reference will now be made in detail to various embodiments of the present utility model, examples of which are illustrated in the accompanying drawings and described below. While the utility model will be described in conjunction with exemplary embodiments, it will be understood that present description is not intended to limit the utility model to those exemplary embodiments. On the contrary, the utility model is intended to cover not only the exemplary embodiments, but also various alternatives, modifications, equivalents and other embodiments, which may be included within the spirit and scope of the utility model as defined by the appended claims.

Example 1

Figure 1:
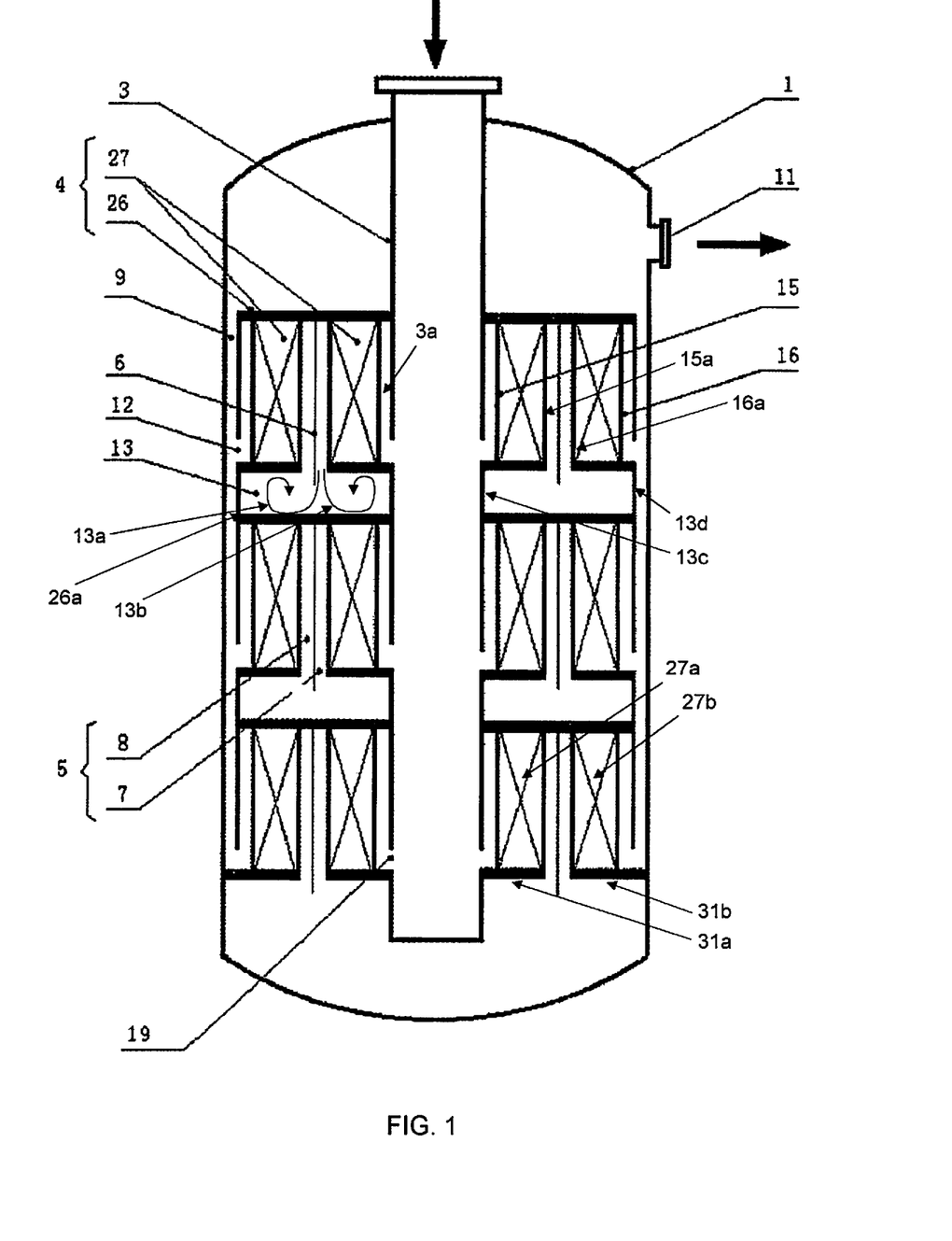
FIG. 1 is a schematic cross-sectional view of a radial-parallel catalytic reactor, according to an embodiment of the present utility model.

With reference to FIG. 1, it shows a radial-parallel catalytic reactor according to one embodiment of the present utility model, comprising a reactor shell 1 and three axially juxtaposed radial catalytic-reaction beds 4 along a feed tube 3 in the shell 1; each radial catalytic-reaction bed 4 has an inner perforated plate 15 in communication with the feed tube 3; an inlet 19 of the feed tube is provided at an appropriate position of the feed tube 3, and the inlet 19 together with the inner perforated plate 15 of the radial catalytic-reaction bed 4 forms a gas-distribution channel.

In this embodiment, each radial catalytic-reaction bed 4 is divided into two bed layers 27, and the bed layers 27 in a same radial catalytic-reaction bed 4 have a common top plate 26; the bed layers are filled with the same or different catalysts, depending on reaction requirements, which may include ammonia synthesis, hydrocarbon catalytic reactions, or similar large scale industrial processes. Between the first layer and the second layer, there is disposed an annular gap 5. Within the annular gap 5, there is provided an annular baffle 6; the upper end of the annular baffle 6 is sealed by welding together with the common top plate 26 of the radial catalytic-reaction bed 4, and the lower end of the annular baffle 6 extends through a scallop hole on a lower baffle of the radial catalytic-reaction bed 4, and, together with said catalyst-bed spacing 13, is continuous with a first annular channel 7 and a second annular channel 8. An outer perforated plate 16 of the radial catalytic-reaction bed 4 is in communication with an outer opening 12 on the interlining 9 of the shell 1, and constitutes a gas-collection channel of the radial reaction bed.

During work of the reactor of this embodiment, reaction mass is fed from the feed-tube inlet 19 and through the feed tube 3 into the gas-distribution channel 3a of the first catalyst bed 27a, and after reaction in the first catalyst bed 27a, passes into the first channel 7 and directed downward to its outlet in said spacing 13.

A mixer spacing 13 is continuous with the first channel 7 and second channel 8 and is defined by an inner downward extension 13c of the perforated inlet plate 15, an outer extension 13d of the perforated outer plate 16, lower surfaces of the first catalyst bed bottom plate 31a and second catalyst bed bottom plate 31b; and a top surface of a second common top plate 26a of a second elevation located below a first elevation.

The process gas is then impacted upon a top surface of another common top plate for a second elevation of first and second catalyst beds identical to those described above. Upon such impact, the process gas is divided into two portions, where one portion swirls toward the shell 1 in path 13a and a second portion swirls toward the feed tube 3 in path 13b. Only after sufficient commingling of the first and second portions achieves substantial uniformity of gas composition and temperature does it flow into an inlet opening of second channel 8 for even distribution across second catalyst bed inlet plate 16a, through the second catalyst bed 27b, out through outer perforated plate 16, and to shell interlining 9 into the shell 1, then flows through a discharge port 11 to the outside of the reactor shell 1.

Further, first catalyst bed 27a lies radially closer to feed tube 3 than second catalyst bed 27b. The catalyst space within catalyst bed 27a is defined by a lower surface of common top plate 26, a top surface of first catalyst bed bottom plate 31a, an inner perforated plate 15, and first catalyst bed outlet plate 15a. The catalyst space within catalyst bed 27b is defined by a lower surface of common top plate 26, a top surface of second catalyst bed bottom plate 31b, an outer perforated plate 15, and second catalyst bed inlet plate 15a. Each of those catalyst spaces define a cylindrical annular space located at an equal elevation within the shell 1 and feed tube 3.

Example 2

Figure 2:
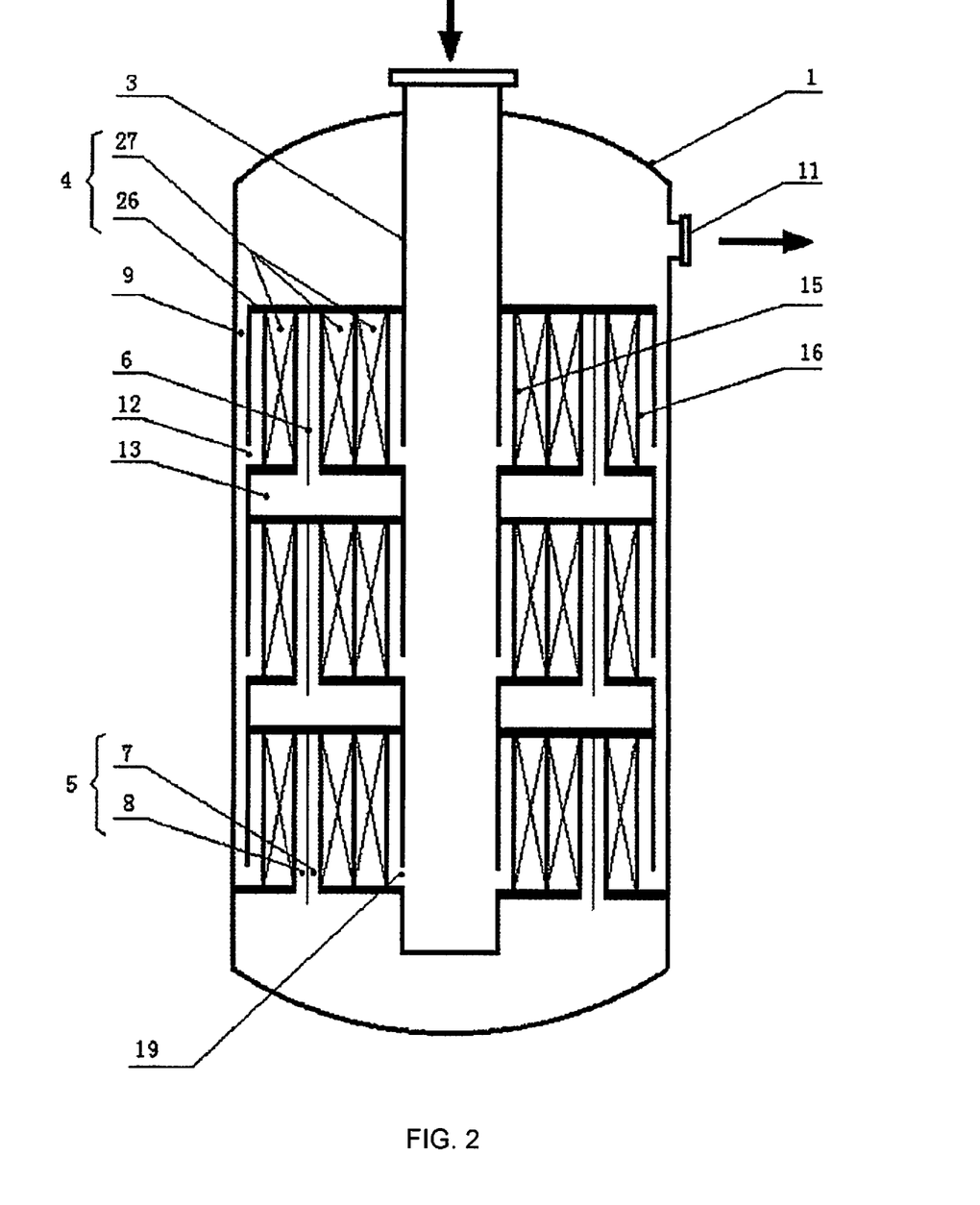
FIG. 2 is a schematic cross-sectional view of a radial-parallel catalytic reactor, which comprises a radial catalytic-reaction bed having three reaction bed-layers, according to an embodiment of the present utility model.

With reference to FIG. 2, the radial-parallel catalytic reactor in this embodiment is substantially the same as the one in Example 1, except that the reactor in this embodiment comprises a catalytic-reaction bed 4 having three bed-layers, wherein an annular gap is provided between second reaction bed-layer and third reaction bed-layer along a flow direction of reaction mass.

Similarly, depending on actual reaction needs, an annular gap may be provided between first and second reaction bed-layers or between each reaction bed-layer along the flow direction of reaction mass.

Likewise, the present utility model may comprise a plurality of reaction bed-layers and a plurality of annular gaps between the bed-layers. For clarity, the variants are not described here in detail. It should be understand by the skilled in the art that the variants of these embodiments all fall in the scope of the present utility model as claimed.

Example 3

Figure 3:
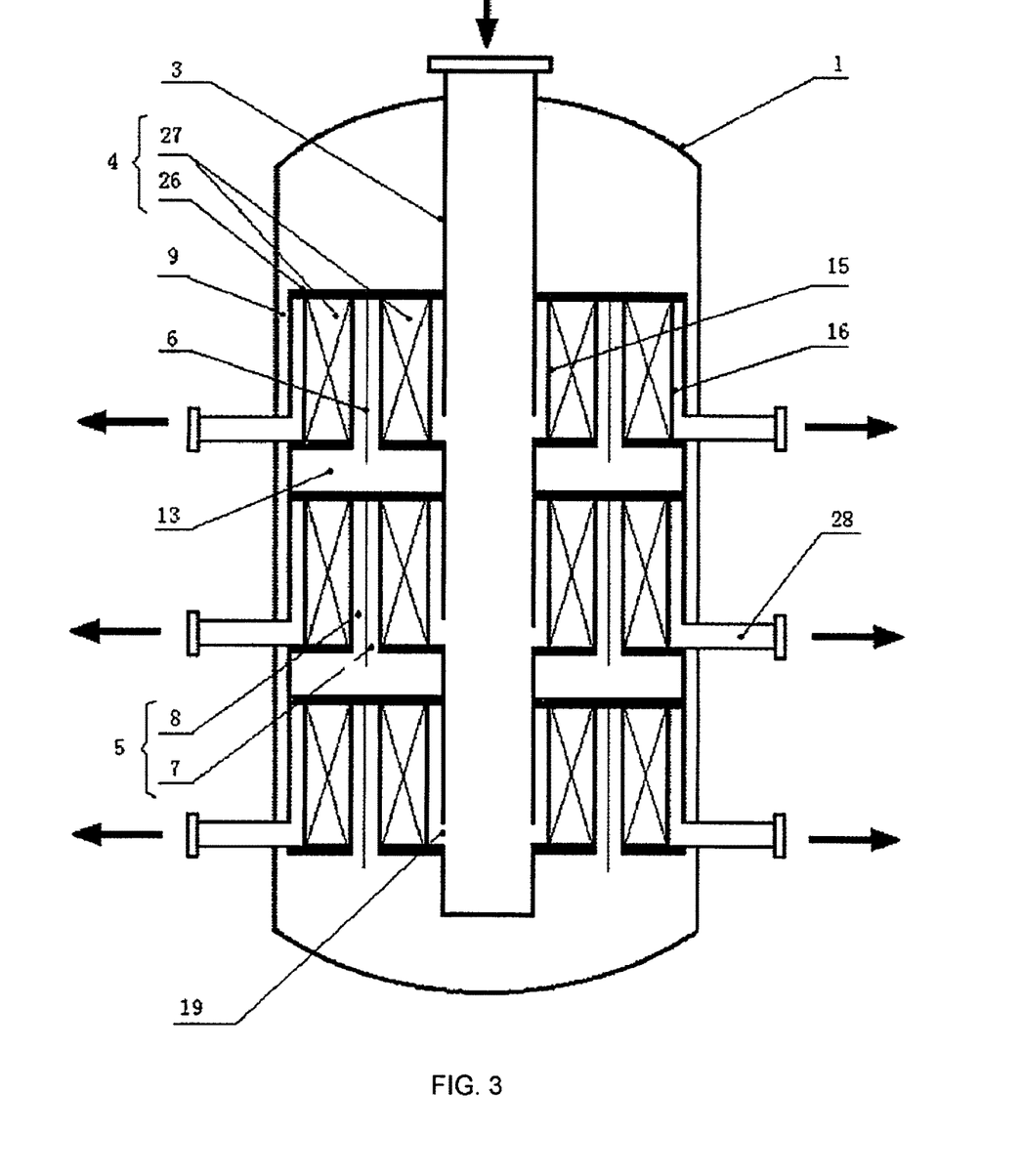
FIG. 3 is a schematic cross-sectional view of a radial-parallel catalytic reactor, which uses an external tube to discharge reaction products, according to an embodiment of the present utility model.

With reference to FIG. 3, the radial-parallel catalytic reactor in this embodiment is substantially the same as the one in Example 1, except that the reactor in this embodiment uses an external tube 28 as a substitute for the interlining 9 to discharge the reaction products.

Example 4

Figure 4:
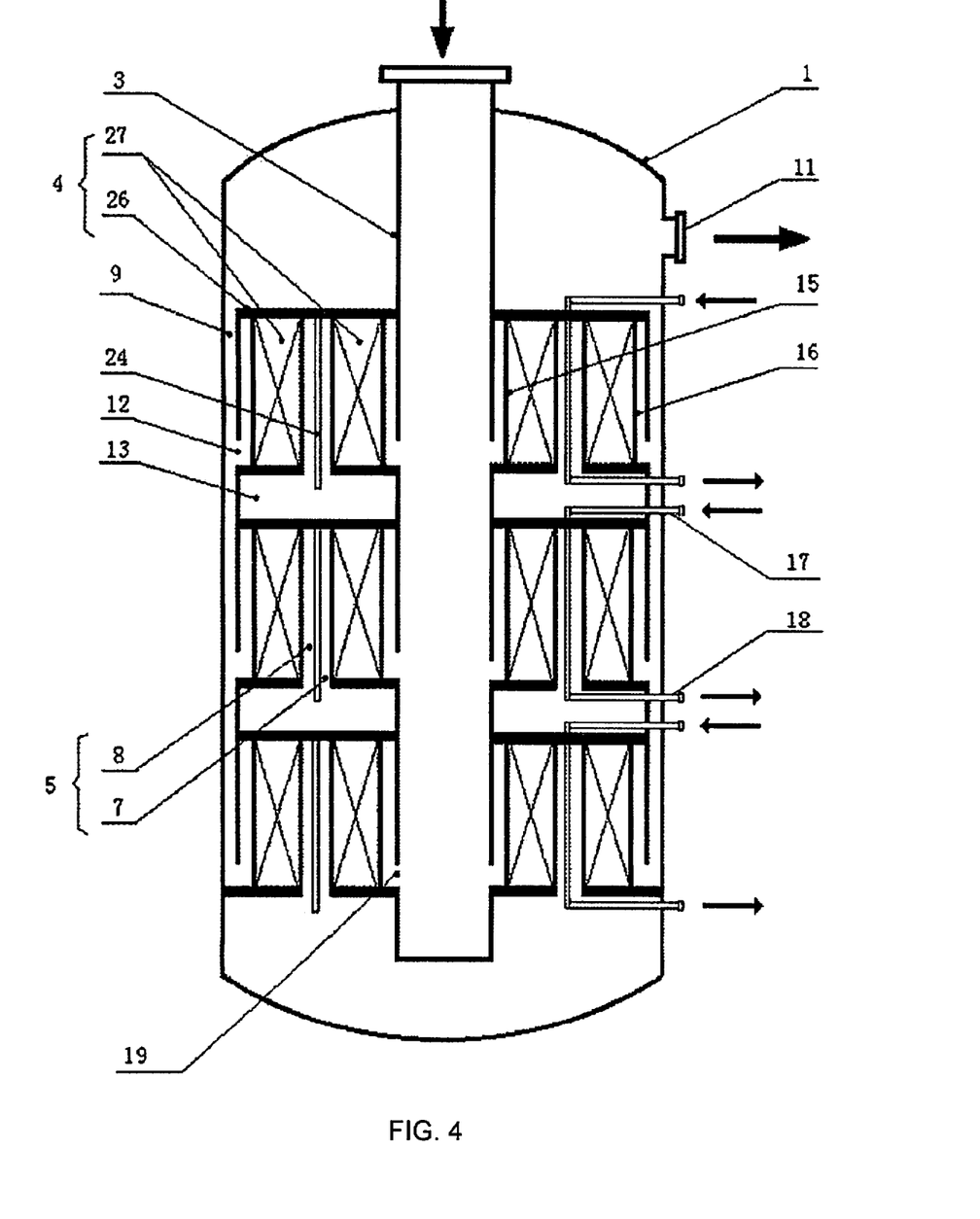
FIG. 4 is a schematic cross-sectional view of a radial-parallel catalytic reactor, which comprises a spiral-plate heat exchanger, according to an embodiment of the present utility model.

With reference to FIG. 4, the radial-parallel catalytic reactor in this embodiment is substantially the same as the one in Example 1, except that the reactor in this embodiment uses a spiral-plate heat exchanger 24 as a substitute for the annular baffle 6 in Example 1. The spiral-plate heat exchanger 24 has coolant tubes 17, 18 extending outside the shell 1 for introducing and withdrawing coolant respectively; during work, reaction mass is fed from the inlet 19 and through the feed tube 3 into the gas-distribution channel of the catalyst bed, and after reaction in the catalyst bed, undergoes heat transfer by means of the heat exchanger 24, then passes through the channels 7 and 8 into a next bed-layer, and finally passes through the gas-collection channel and the shell interlining 9 into the shell 1, then flows through the discharge port 11 to the outside of the reactor.

Example 5

Figure 5:
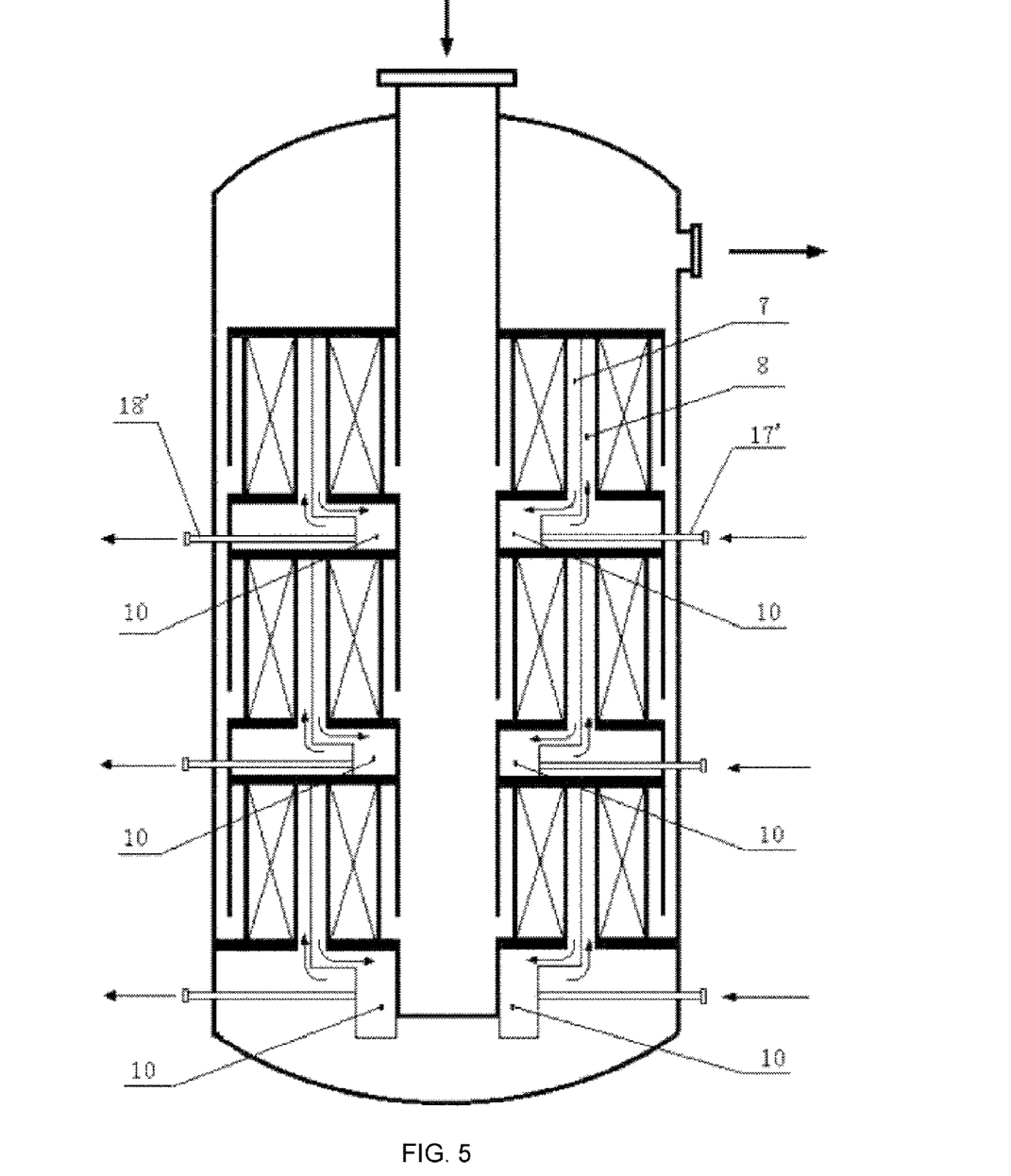
FIG. 5 is a schematic cross-sectional view of a radial-parallel catalytic reactor, which comprises a heat exchanger having a coolant tube extending outside the shell, according to an embodiment of the present utility model.

With reference to FIG. 5, the radial-parallel catalytic reactor in this embodiment is substantially the same as the one in Example 1, except that the reactor in this embodiment has a heat exchanger 10 provided in the catalyst-bed spacing 13, and the heat exchanger 10 has thereon coolant tubes 17', 18' extending outside the shell 1 for removing the exchanged heat. Reaction mass that has gone through reaction at a previous catalyst layer, passes through the channel 7 into the heat exchanger, and after heat transfer, passes through the channel 8 back to the catalyst bed into a next catalyst layer, and after reaction, flows through the shell interlining 9 and the discharge port 11 on the shell 1 to the outside of the reactor.

Example 6

Figure 6:
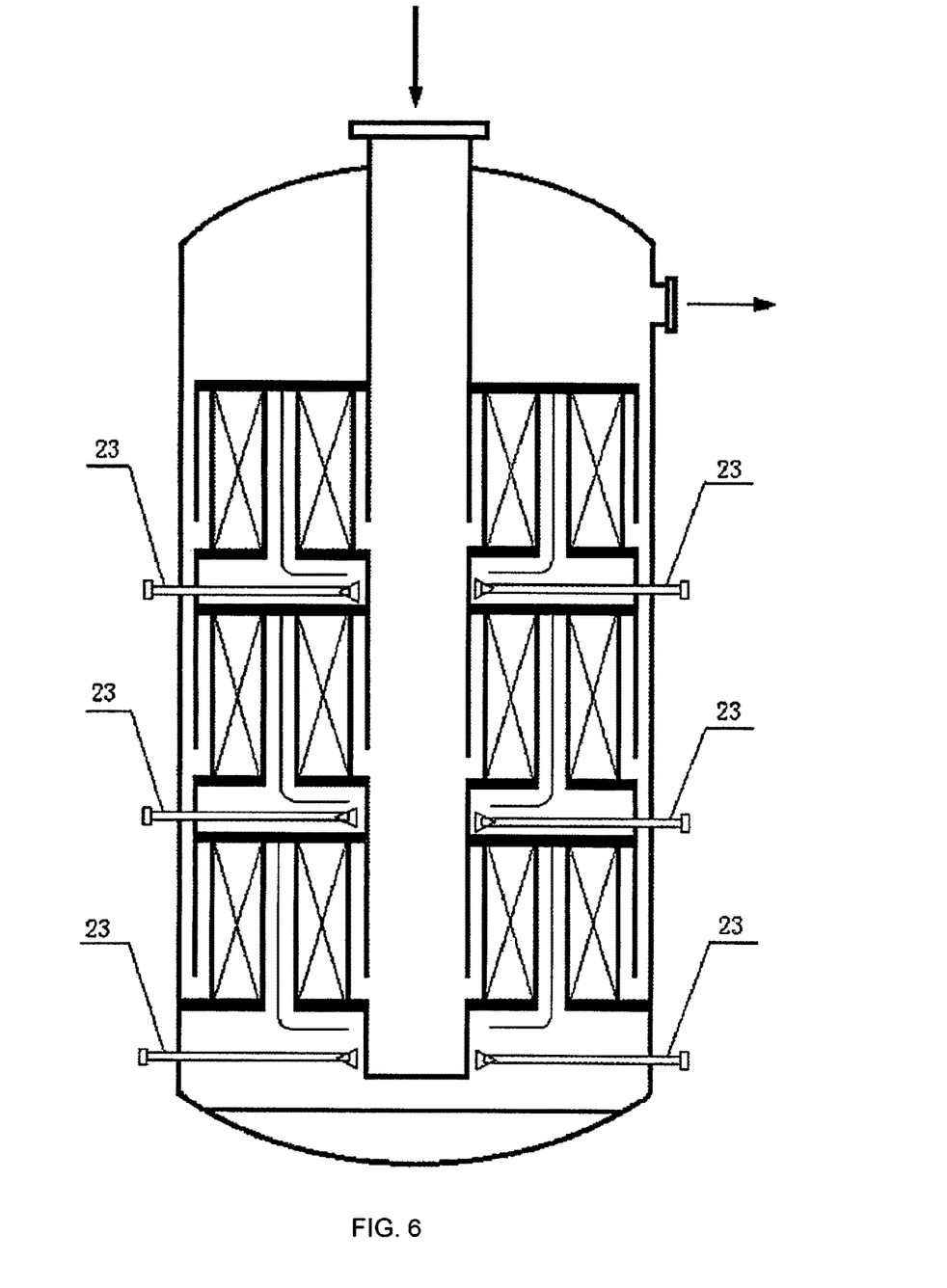
FIG. 6 is a schematic cross-sectional view of a radial-parallel catalytic reactor, which comprises a quench-fluid introducing means, according to an embodiment of the present utility model.

With reference to FIG. 6, the radial-parallel catalytic reactor in this embodiment is substantially the same as the one in Example 1, except that the reactor in this embodiment has a quench-fluid introducing means 23 provided in the catalyst-bed spacing 13, and the quench-fluid introducing means 23 has a tube extending outside the shell 1 for introducing quench fluid into the catalyst-bed spacing 13. Reaction mass that has gone through reaction at a previous catalyst layer, passes through the channel 7 into the catalyst-bed spacing 13, and mixes with quench fluid introduced by the quench-fluid introducing means 23, then passes through the channel 8 into a next catalyst layer, and after reaction, flows through the shell interlining 9 and the discharge port 11 on the shell to the outside of the reactor.

Example 7

Figure 7:
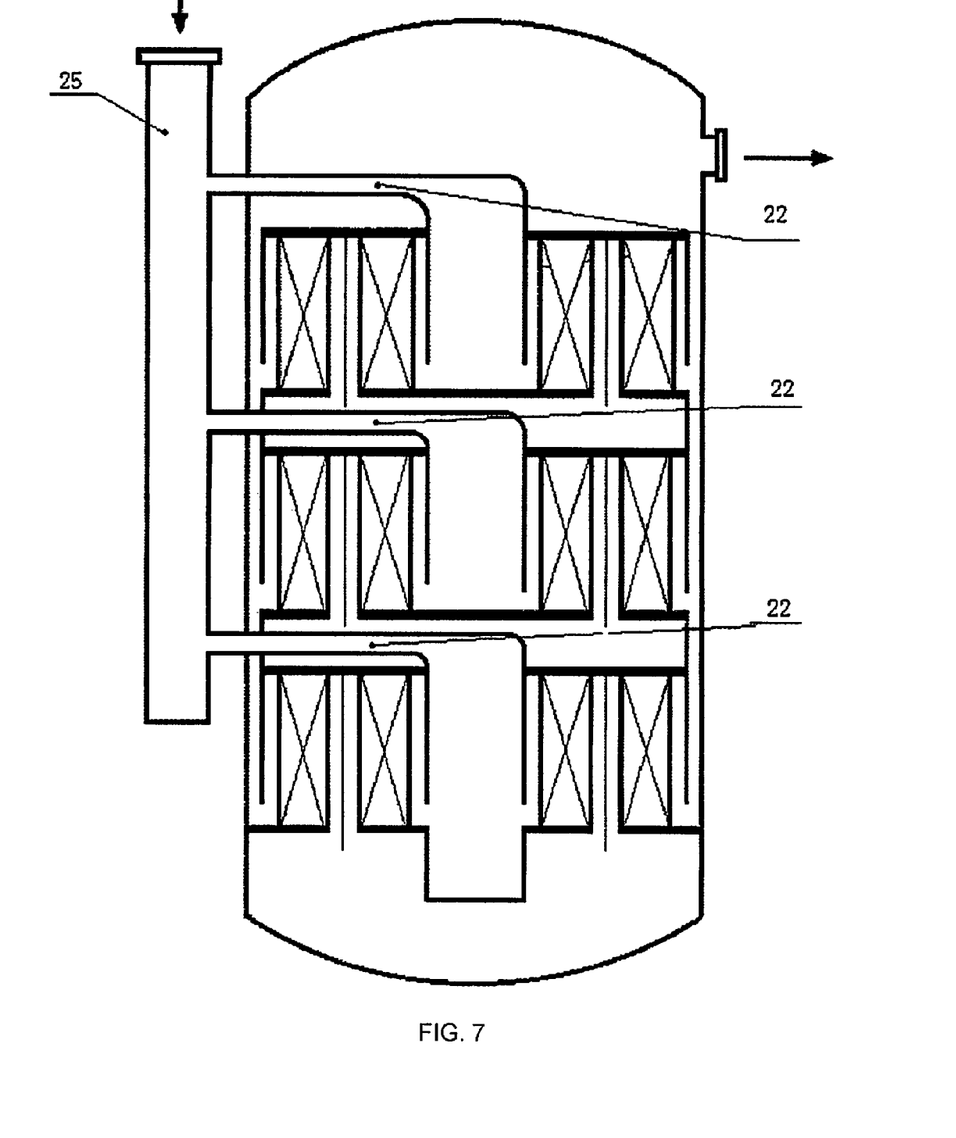
FIG. 7 is a schematic cross-sectional view of a radial-parallel catalytic reactor, of which the feed tube is located outside the shell, according to an embodiment of the present utility model.

With reference to FIG. 7, in this embodiment, the feed tube comprises a primary feed tube 25 and a branch tube 22, the primary feed tube 25 being disposed outside the shell and in connection with each radial catalytic-reaction bed via the branch tube 22; the others are the same as those in Example 1.

Example 8

Figure 8:
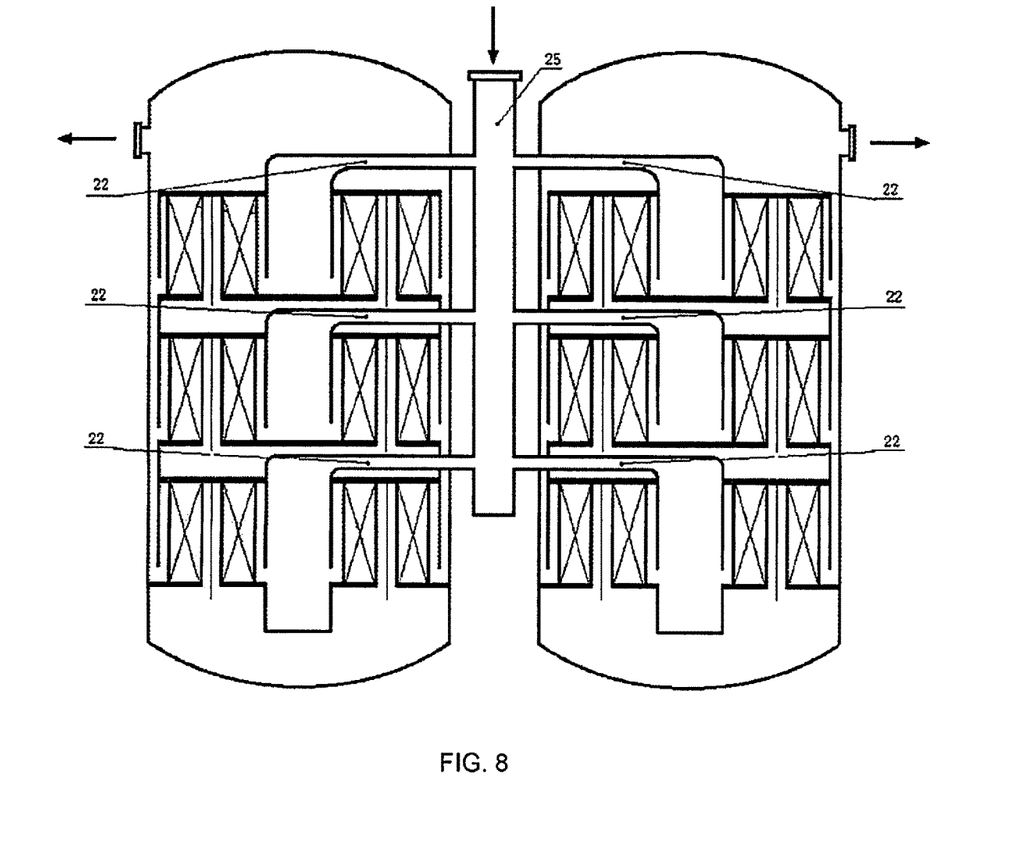
FIG. 8 is a schematic cross-sectional view of a combination of the radial-parallel catalytic reactors according to an embodiment of the present utility model.

With reference to FIG. 8, in this embodiment, the primary feed tube 3 is disposed outside the shell, and connected simultaneously with the catalytic-reaction beds in shells of two reactors via the branch tubes 22; the others are the same as those in Example 7.

For certain catalytic processes and catalyst types, hot spots or crushed catalyst sometimes develop within a radial flow catalyst bed, impairing total process throughput of an entire radial flow reactor. A disability of prior art reactors has been that the operator of the reactor has been forced to choose between shutting the reactor down with loss of income to replace catalyst (sometimes all the catalyst when unwarranted merely to avoid a future shutdown) and continuing to operate the reactor until process throughput is so impaired that shutdown cannot be avoided.

Providing two to ten elevations of radial reactors, and more preferably three to five elevations, permits the operator to selectively leave one to nine elevations dormant and without process gas feed until an operating elevation of the radial reactor becomes impaired. The impaired reactor can be turned off to turned down as to process feed gas, with the balance of desired feed gas being fed to one or more previously non-operating elevations of the radial reactor.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

We claim:

1. An axial-radial catalytic reactor, comprising a vertically longitudinal shell with a vertical axis and a feed tube, the feed tube adapted to act as an axial conduit from a process gas source to an interior space of the shell along the vertical axis, the improvement comprising:
   (a) two or more elevation levels arranged vertically within the shell, each elevation level being essentially identical and with a first elevation level comprising:
      (i) a first catalyst bed annularly arranged around the feed tube and proximal to the feed tube for receiving feed gas from it, maintained within a first space defined by part of a first common top plate above the first catalyst bed, a perforated inlet plate, a perforated first catalyst bed outlet plate, and a first catalyst bed bottom plate;
      (ii) a second catalyst bed annularly arranged around the feed tube and distal to the feed tube, maintained within a second space defined by part of the first common top plate above the second catalyst bed, a perforated second catalyst bed inlet plate, a perforated outlet plate, and a second catalyst bed bottom plate;
      (iii) the first common top plate sealing an annular space between an outside surface of the feed tube and a top edge of the perforated outlet plate;
      (iv) an annular gap defined between the first catalyst bed outlet plate and the second catalyst bed inlet plate, wherein a solid baffle is fixed to an underside of the first common top plate to define a first channel proximal to the feed tube and a second channel distal to the feed tube;
      (v) a mixer spacing continuous with the first channel and second channel and defined by an inner downward extension of the perforated inlet plate, an outer extension of the perforated outer plate, lower surfaces of the first catalyst bed bottom plate and second catalyst bed bottom plate; and a top surface of a second common top plate of a second elevation located below the first elevation; and
      (vi) an annular gas collection space defined by an inside of the shell and the perforated outer plate, which is continuous with an outlet conduit for allowing gas exiting the second catalyst bed through the perforated outer plate to flow out of the shell.

2. The reactor of claim 1 wherein elevations are from two to ten.

3. The reactor of claim 2 wherein elevations are from three to five.

4. The reactor of claim 1 wherein a lower edge of the baffle is extended toward the shell so that the first channel is L-shaped.

5. The reactor of claim 1 wherein a collecting conduit is adapted to collect process gas from each elevation and pass it outside the shell.

\* \* \* \* \*